(12) United States Patent
Rasmussen (10) Patent No.: US 7,066,562 B2
(45) Date of Patent: Jun. 27, 2006

(54) GROUSER SHOE AND FABRICATION METHOD

(76) Inventor: Robert Rasmussen, 29839 Knollview Dr., Rancho Palos Verdes, CA (US) 90274

( * ) Notice: Subject to any disclaimer, the term of this patent is extended or adjusted under 35 U.S.C. 154(b) by 267 days.

(21) Appl. No.: 09/967,277

(22) Filed: Oct. 1, 2001

(65) Prior Publication Data

US 2003/0062772 A1    Apr. 3, 2003

(51) Int. Cl.
*B62D 55/26* (2006.01)

(52) U.S. Cl. .................. 305/191; 305/201; 29/891.1
(58) Field of Classification Search ............. 305/191, 305/192, 201, 160, 161, 162, 185, 198, 53; 29/891.1
See application file for complete search history.

(56) References Cited

U.S. PATENT DOCUMENTS

| | | | | |
|---|---|---|---|---|
| 1,952,545 A | * | 3/1934 | Gotshall ................ 29/891.1 |
| 2,393,336 A | * | 1/1946 | Myers .................... 305/191 |
| D157,905 S | * | 3/1950 | Risk ...................... 305/201 |
| 2,549,930 A | * | 4/1951 | Riegel et al. ............ 219/635 |
| 2,866,667 A | * | 12/1958 | Ratkowski .............. 305/191 |
| 2,903,303 A | * | 9/1959 | Weller ................... 305/191 |
| 2,964,361 A | * | 12/1960 | Hansen .................. 305/191 |
| 2,999,723 A | * | 9/1961 | Ostberg et al. ......... 305/201 |
| 3,071,417 A | * | 1/1963 | Militana ................. 305/191 |
| 3,278,244 A | * | 10/1966 | Deffenbaugh et al. .... 305/191 |
| 3,355,224 A | * | 11/1967 | Skanes et al. ............ 305/53 |
| 3,372,959 A | * | 3/1968 | Watts, Jr. ................ 305/201 |
| 3,477,768 A | * | 11/1969 | Culver ................... 305/191 |
| 3,912,338 A | * | 10/1975 | Toews .................... 305/191 |
| 4,021,082 A | * | 5/1977 | Rasmussen ............. 305/192 |
| 4,043,610 A | * | 8/1977 | Halmosi et al. ......... 305/19 |
| 4,099,796 A | * | 7/1978 | Groff ...................... 305/46 |
| 4,383,718 A | * | 5/1983 | Ragon ..................... 305/53 |
| 5,165,766 A | * | 11/1992 | Thomas .................. 305/191 |
| 5,186,526 A | * | 2/1993 | Pennington ............. 305/191 |
| 5,482,365 A | * | 1/1996 | Peterson et al. ......... 305/197 |
| 5,547,268 A | * | 8/1996 | Hansen ................... 305/191 |

* cited by examiner

*Primary Examiner*—Russell D. Stormer

(57) ABSTRACT

A grouser shoe for track drives commonly utilized by industrial and commercial equipment (e.g., bulldozers, backhoes, cranes, etc.) including a supportive pad and a ground engaging bar, the ends of such bar being bent to form wings, and method of manufacture thereof. The center portion of the bar provides the primary transmission of driveforce from the vehicle to the ground, while the wings provide for significant reduction in vibration, facilitate steering, provide easier turning, and extend the service life of the grouser shoe.

40 Claims, 8 Drawing Sheets

100 — INTEGRAL SHOE WITH PAD AND BAR

101 — SHEAR END OF BAR FROM PAD

102 — FORM BEND AT SHEARED END

103 — WELD SHEARED BENT END TO PAD

104 — TREAT SHOE

105 — ATTACH DRIVELINK TO PAD

FIG. 20

GROUSER SHOE AND FABRICATION METHOD

FIELD TO WHICH THE INVENTION RELATES

Grouser shoes are used on bulldozers, backhoes, cranes, and other devices for providing individual segments to the crawler tracks thereof. This invention is directed to a grouser shoe with end wings and methods for fabricating same.

BACKGROUND OF THE INVENTION

Ground engaging track drives with grouser shoes are utilized for bulldozers, backhoes, cranes, and other industrial and commercial equipment. The purpose of these ground engaging track drives is to physically support the heavy equipment over a significant contact area while also providing for a reliable, long-life driving engagement with the ground on which the device is utilized. As an example of the former, on a large bulldozer the net pressure of the bulldozer is reduced to that similar to a grown man standing on tip toes. As an example of the latter, these devices are used to drivingly engage a wide variety of surfaces, ranging from rock in an industrial mine to light sand/soil in construction of a road. The track drives are typically optimized for each utilization in consideration for the type of equipment, the nature of the power to the ground, the surface on which the equipment will be utilized, and other factors. Typically, the base section supports the equipment and the bar provides traction. As the bar penetrates the earth, it is subject to wear over time due to slippage or contact with hard surfaces, such as rock. The materials of which the grouser shoe is manufactured are also important, both for wear resistance, power transference to the surface and potential damage to the surface. The former is typically accomplished by the relatively flat base or pad section of the shoe and the latter by a bar member which extends off from the pad surface.

Although industrial procedures for producing grouser shoes in single and multiple part construction of varying shapes and hardness are known, relatively little has been accomplished in recent years in respect to breakthrough construction techniques or in fundamental design change.

Design variations have been limited by the described manufacturing methods and otherwise.

SUMMARY OF THE INVENTION

It is an object of this invention to cost less than a cast shoe of a material such as manganese;

It is a further object of this invention to increase the service life of grouser shoes;

It is another object of this invention to increase the operator control of devices using grouser shoes;

It is yet another object of this invention to provide for a more comfortable operating environment to operators;

It is an object of this invention to differentially harden the various components of a grouser shoe; and, It is still a further object of this invention to enhance turning performance of devices including grouser shoes.

Other objects and a more complete understanding of the invention may be had by referring to the drawings in which:

DETAILED DESCRIPTION OF THE INVENTION

The invention of this application relates to an improved grouser shoe of a unique configuration together with a method of manufacture thereof.

Figure 1:
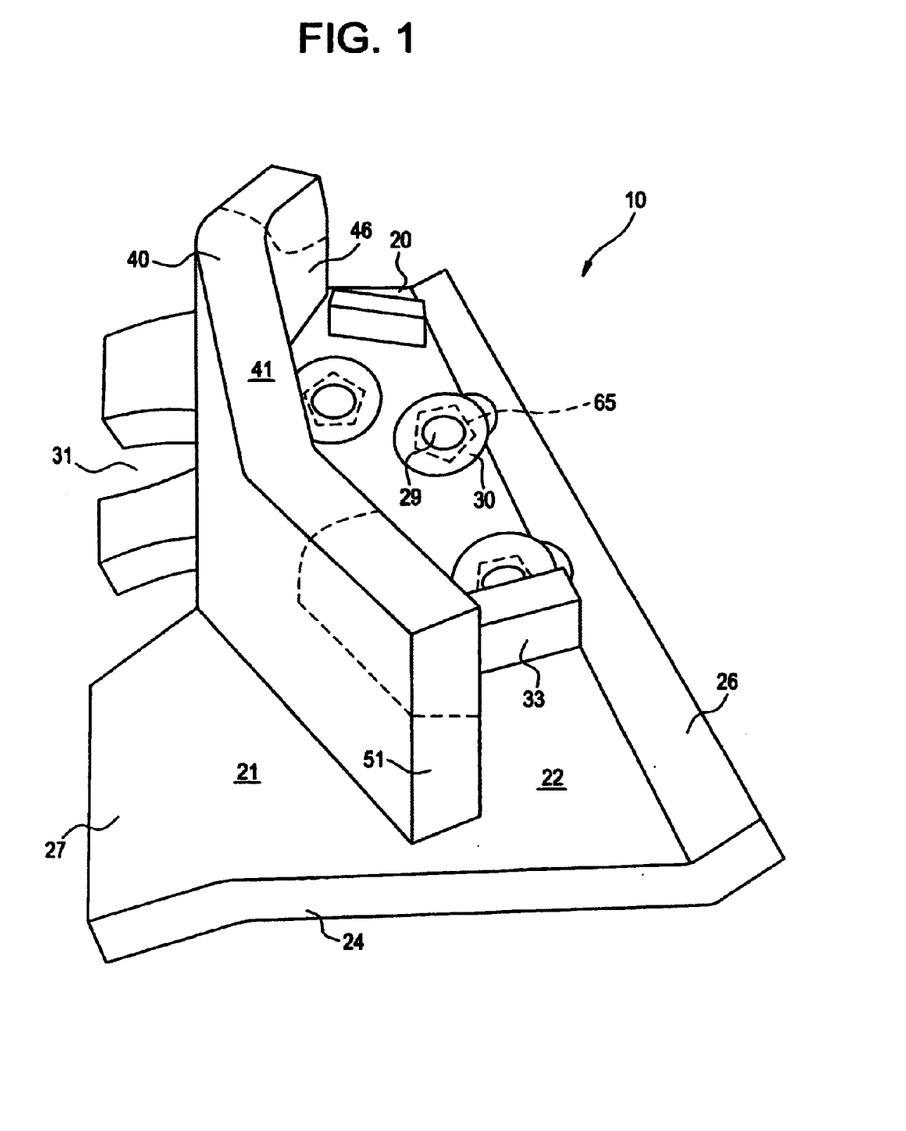
FIG. 1 is a perspective view of a grouser shoe including the wings of the invention.

The present invention relates to a grouser shoe 10 which has a pad 20 and a bar 40 (FIG. 1).

The shoe itself is for engaging the ground in order to provide the support and drive for a tracked vehicle. Typically this tracked vehicle is a bulldozer or a heavy loader, although it is suitable for use with other forms of tracked vehicles.

The size, shape, and configuration of the shoe is selected in view of the particular tracked vehicle with which the shoe is to be utilized. This will differ from device to device as well as manufacturer to manufacturer. The present shoe is to be utilized with a tracked vehicle having a sprocket-type drive mechanism through an intermediate integral drivelink with additional location/flotation rollers (not shown). The sprocket drive can be a three point with one high sprocket and two idlers or a more conventional one sprocket and one idler configuration. In either case flotation rollers or other intermediate means are utilized to physically support the weight of the vehicle substantially equally across the ground engaging portion of the track.

The pad 20 provides for the basic weight bearing function of the shoe 10. This transfers the physical weight of the vehicle to the ground over a large area. The pad in addition provides for the interconnection between the drivelinks 60 and the later described bar 40. This pad 20 is typically a substantially flat piece 21 having a top surface 22, a bottom surface 24, a leading edge 26 and a trailing edge 27.

The top surface is for providing the surface area for the physical support of the tracked vehicle in addition to providing an interconnection with the later described bar 40.

The size of the top surface 22 of the pad 20 is dependent upon the size, weight, power and capabilities of the tracked vehicle. This typically is under the control of the manufacturer of the machine who optimizes a given track surface area to such machine and usage. For example the aggregate surface area of all of the pads 20 in contact with the ground may be such that on a extremely large bulldozer the net pressure per square inch is on the order of 15 PSI (although obviously this could be varied upward or downwards dependent on the use with which the machine is to be utilized). In general softer ground (sand) needs more surface area than harder ground (rock).

In addition to providing the flotation for the tracked vehicle, the top surface 22 also provides a physical mounting location for the later described bar 40. This connects the bar 40 to the shoe 10 as well as providing for the driving interconnection therebetween.

The bottom surface 24 of the pad 20 is utilized primarily to interconnect the pad 20 to the drivelink 60 located on the underside thereof. This drivelink serves to continuously interconnect the sequential shoes together so as to form a continuous length of track. The drivelink 60 shown (FIG. 20) in addition serves as the drivemember between the motor of the tracked unit and the continuous length of track. Typically floatation rollers in contact with the bottom surface 24 of the shoe, directly or through the drivelinks, interconnect the shoes with the tracked vehicle so as to pass the ground support forces between the shoe and the vehicle.

The drivelink 60 itself is again typically under the control of the manufacturer who ideally optimizes a particular drivelink system to a particular tracked vehicle. The interconnection between the pad 20 and the drivelink 60 will vary dependent upon the overall design of the unit. Since the interconnections between the individual drivelinks are typically repairable (such as by exchange of pins/bushings etal) while the pads are typically replaceable (new/remanufactured units), the pads 20 are preferably releasably connected to the drivelinks 60. In the particular embodiment disclosed, this interconnection is provided by a series of bolts 65 (phantom form in FIG. 1) extending through a series of partially recessed bolt holes 29 extending through the flat piece 21 of the pad. This interconnection allows each individual pad 20 to be separated from the continuous length of track without compromising the integrity thereof (i.e., the pads 20 can be replaced one at a time with a minimum of difficulty). The recess 30 allows for more precise fit of the bolts 65 to the top surface 22 by insuring a reliable flat plane for the underside of the bolts. This also aids in the uniformity of the bolt tightening torque between holes and between shoes, The recess also permits a more compact shoe (or larger bolts) by cutting away the leading edge. With other types of tracked vehicles, other interconnections between the pad 20 and drivelink 60 may be appropriate. This would include other forms of releasable or permanent interconnections. The type of interconnection would be dependent upon the expected service longevity of the shoes and their various components as well as the longevity of the tracked vehicle itself. In general, the longer the vehicle lasts and the more the bar wears from driving the machine, the more replaceable the pads 20 should be.

The leading 26 and trailing 27 edges of the pad 20 are designed to facilitate ground engaging on soft surfaces as well as increasing the overall cooperation between adjoining shoes. For example, in the presently disclosed preferred embodiment the leading edge 26 is formed at an upward angle while the trailing edge 27 is formed at a downward angle. This provides for a sand trap area at the top surface 22 between the back of the leading edge 26 and the later described bar 40. This also allows the pads 20 of two consecutive shoes to slightly overlap without interference. This not only creates pockets to trap soft ground but also creates a seamless ground engaging surface for a consecutive length of track. It in addition aids in the prevention of the migration of contaminants through the track to the drivelinks 60 and associated drive components. This facilitates soft ground drive engagement as well as lengthening the service life of the track between lubrication/cleaning/maintenance. Further these edges 26, 27 strengthen the bending strength of the flat piece 21 of the pad 20. The upward extension of the pad in addition aids slightly to the driving connection to the ground, and this at a location slightly displaced from the bar (the downward extension does also but to a marginal degree).

Note that in the embodiment disclosed the overlap between consecutive pads also provides for the possibility of physical contact between the trailing edge 27 and the drivelink 60 at its bolted joint with the pad 20. For this reason cutouts 31 are formed in the trailing edge 27 so as to prevent contact problems at this location (directly or indirectly via contaminant buildup). Note that if desired other cutouts could be included in the pad 20 for various other purposes.

Figure 20:
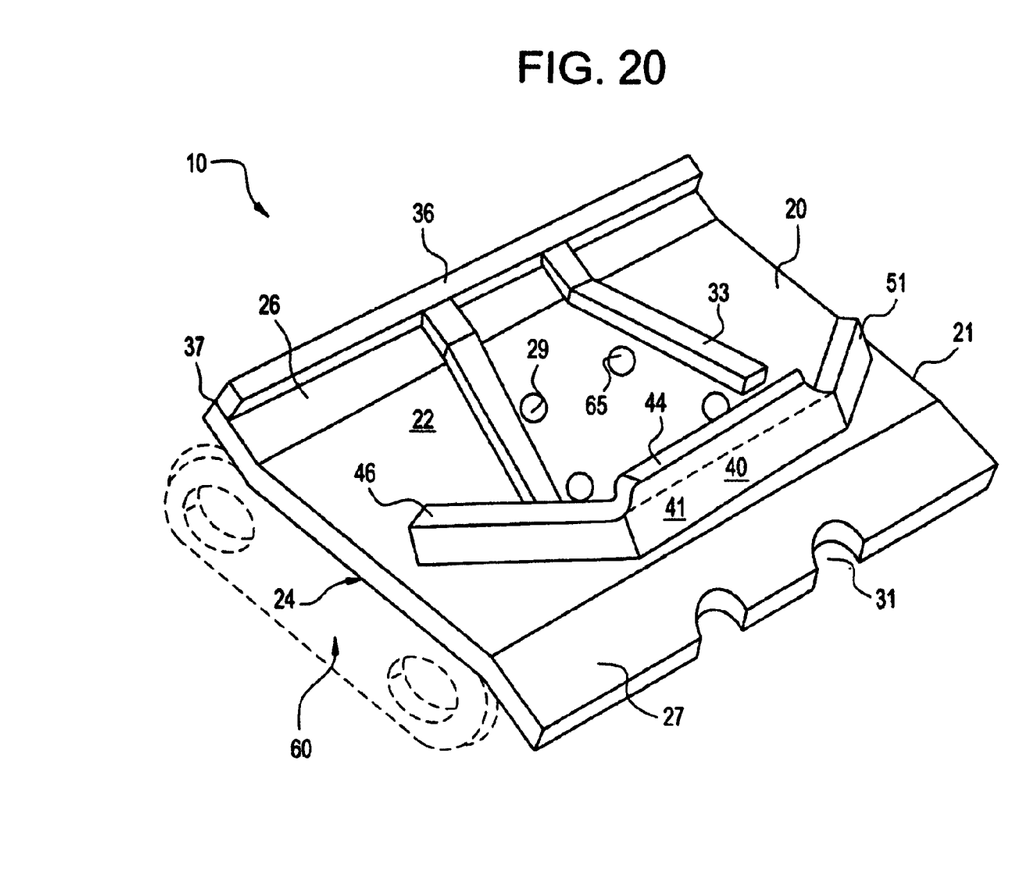

The preferred embodiment disclosed includes bolt protectors 33 on the top surface 22 of the pad 20 (FIGS. 1, 20). A wear bar 36 may also be included (FIG. 20). Both of these are replaceable separately of the remainder of the shoe if desired.

The bolt protectors 33 extend upwards off of the top surface 22 to protect the heads of the bolts 65 and reduce wear. They reduce the physical damage thereto by rocks and other debris. They also slow down the compaction of smaller contaminants into the bolt holes 29 and recesses 30 surrounding such heads.

In the preferred embodiment disclosed the bolt protectors 33 are located outside of each pair of bolt holes displaced substantially parallel to the axis therebetween. Leading, trailing and/or inside locations could also be utilized.

The wear bar 36 extends upwards from the leading edge 26 of the top surface 22 to reduce the physical wear thereon (FIG. 20). This is particularly so for the upper end 37 of such edge 26, this end 37 being the highest point of the pad 20. Further the wear bar 36 can be replaced relatively independently of the rest of the shoe 10.

In the preferred embodiment disclosed the wear bar 36 is located at the end 37 of the leading edge 26. Further the bolt protectors 33 are also extended forwardly over the leading edge 26 to the wear bar 36 attached thereto. This causes the bolt protectors to reinforce the leading edge 26 (primarily against flexing) and the wear bar 36 (primarily against displacement).

The bar 40 extends upwardly off of the top surface 22 of the pad 20. This bar forms the primary ground engaging drive interconnection for the shoes 10 of the tracked vehicle. These bars 40 thus complete the drive interconnection from the vehicles drive sprocket through the drivelinks and pads to the ground. In situations involving hard surfaces the bar 40 may additionally physically support the tracked vehicle (up to the exclusion of the remainder of the shoe) (i.e., surfaces having a strength approaching that of the bar, for example on rock).

In the preferred embodiment disclosed, the bar 40 has two wings 46, 51.

The bar 40 provides for the primary transmission of driveforce from the vehicle to the ground. This provides for a relatively efficient transfer of force at this particular location (aided by the closure of the wings as later described). This strengthens the interconnection therebetween as well as reducing fatigue separation concerns. This bar is preferably substantially perpendicular to the top surface of the pad 20.

The particular bar 40 is disclosed with an optional differential raised section 44 substantially co-extensive with the center thereof (dashed lines in FIG. 1; solid lines in FIG.

20). This optional center section 44 provides for greater penetration into the ground at this particular location. In addition, it concentrates the weight of the vehicle initially at this center section, thus allowing for a sequential differential application of force across the length of the bar 40 in engagement with the ground. This facilitates the penetration movement of the bar thus to allow the support forces to be absorbed by the flat piece 21 of the pad 20. It also reduces the pressure on the outside ends of the bar 40. It is preferred that this center section be over the rails of the drivelink 60, these latter proving the primary support for the pads 20. This provides for an efficient load transfer while also reducing wear on the drive link together with its pins and bushings.

The two wings 46, 51 are designed to work with the center 41 of the bar in the drive and support of the tracked vehicle. These wings provide for a significant reduction in vibration, will facilitate the steering, provide easier turning and less noise in addition to extending the in service life of the shoes 10.

The wings accomplish this due to a series of attributes, these attributes most apparent in contrast to a conventional straight bar type device. These advantages include greater longitudinal contact, an impediment to flow by the ends, increase tip longevity and greater application of driving force in any turn.

Figure 2:
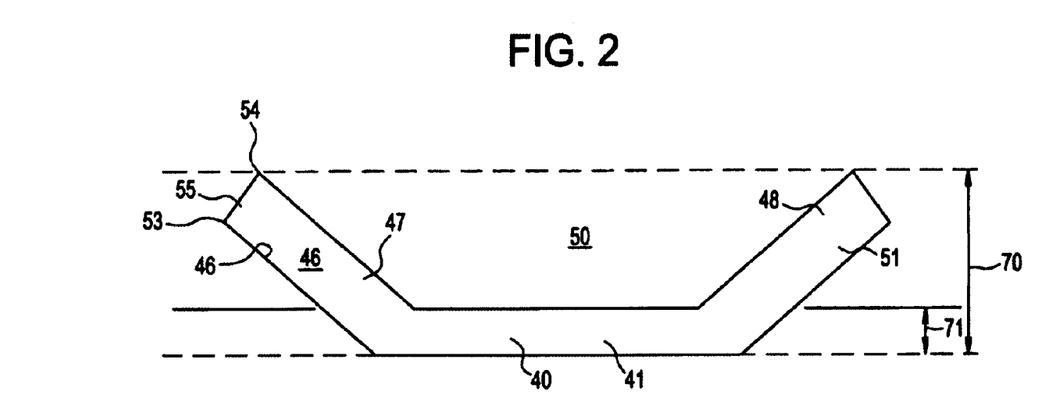
FIG. 2 is a cross-sectional view of a bar of FIG. 1.

In respect to the greater longitudinal contact with the ground, the wings extend diagonally off of the center section of the bar. This spreads the loading of the bar over a greater effective longitudinal area than otherwise. For example in the preferred embodiment the new longitudinal contact 70 area is significantly longer than the old contact area 71 (the latter being co-extensive with the width times length of the bar) (FIG. 2). This lengthens the longitudinal contact area significantly. This is important on the harder surfaces because it spreads the support loading of the bar 40 over a greater area of the pad 20. This reduces load induced bending of the pad 20 (from a line in conventional unit to an enlarged area).

In respect to the resistance of the flow by the ends, the inner surface 47 of each of the wings creates a pocket 50 behind the bar 40. This forces any residual blowby to pass backwards through an increased pressure contact area, thus resisting the flow of material passing by the bar.

In respect to increased tip longevity, the leading edge 54 is protected by the outer end 55 of the wings and the trailing edge 53 at the back of the bar 40. For this reason, a significantly greater amount of material has to be worn away before the effective total length of the bar 40 is decreased.

Figure 3A:
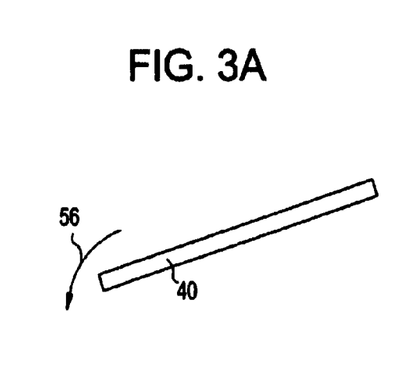
FIG. 3 is a contrast between driving forces on a straight bar and the bar of FIG. 2.
Figure 3B:
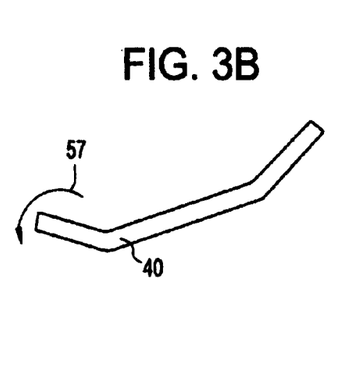

In respect to force on turns a conventional bar, being straight, allows the passage 56 of ground material and debris past the end of the bar (FIG. 3A). In contrast, in the present invention, due to the wings a pocket is created to impede passage 57 (FIG. 3B). The effective driving turn surface 49 is greater than the length of each individual wing due to the fact that each wing will form a pocket 50 which will trap materials, thus extending the effective length of the surface at these locations.

Each wing 46, 51 has a bend between the outer end 48 and the center 41 of the bar. This bend is preferably designed in consideration of the width of the shoe, the number of shoes on the ground together with the use cycle of the tracked vehicle with which the shoe 10 is to be utilized. This may include a shoe with a differential between the bend for one wing 46 versus that of the other wing 51.

Figure 5:
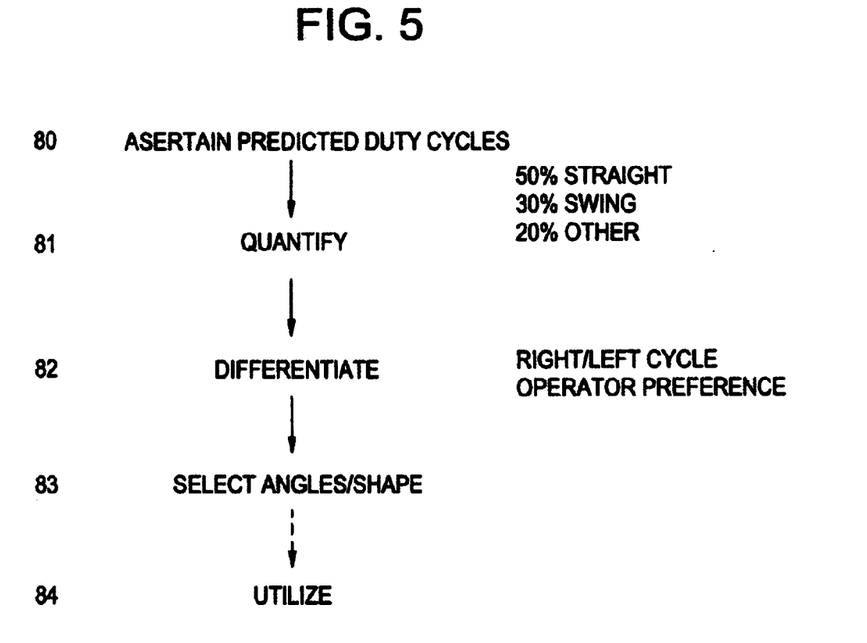
FIG. 5 is a flow chart utilized in the design of the bar of FIG. 2.
Figure 6:
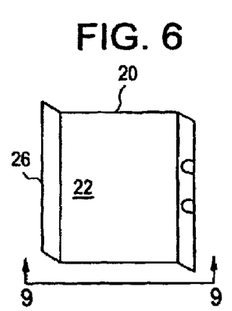
FIGS. 6–8 are top views of the grouser shoes of FIG. 1 during manufacture.

The angles of the wings are selected through a process representative of the tracked vehicle and its operation. After determining the width of the shoes and the numbed of shoes on the ground, these steps include ascertaining the duty cycle of the machine 80, quantifying the usage 81, differentiating between the size of the device 82, the selection of the angles and shape 83 and the utilization of such shapes.

In reference to the width of the shoes and the number of shoes on the ground, in general the greater the width and/or the greater the number of shoes on the ground, the less the angle and length of the wings. While this is somewhat paradoxical, it does recognize that either reduces the effectiveness of wings. For example very wide bars function increasingly as flat engagement pads (i.e., they begin to act similar to hard rubber street pads on concrete). An additional example increasing the number of bars will function increasingly as a single surface (albeit long and maybe skinny) (i.e., it begins to act similar to the accessory for Bobcat type wheel loaders that utilize a single band of continuous rubber about two spaced wheels, one band per side).

The ascertaining of the particular duty cycles involves a mathematical calculation to determine how a particular tracked vehicle will be or is utilized. If the application is a specific one, for example a long face loader in a open pit mine or a bulldozer providing a contour to large fields for a shopping mall, the duty cycle of the machine can be calculated. The former will necessitate a high degree of mobility while the latter will necessitate primarily steering corrections. These define the expected turning point and radius for the particular vehicle (for example see FIG. 4).

The second step of the procedure is to quantify the duty cycles; that is to make a decision that based on this particular duty cycles (i.e., a) 90% forward; b) 50% forward, 30% left side turn, 20% right side turn; c) etc.). It is preferred to optimize the forces on the particular type of operation. This involves examining how the tracked vehicle will be utilized, and more particularly what the power cycling will be. As a matter of drive efficiency, tracked machines are typically designed for ground engaging drive in a straight direction. For this reason the primary duty cycle quantification is the amount of the angle for each of wing bend and the relative percentage of the length of each wing versus total bar length. In general the greater the turning under load the greater both the angle and percentage will be, with any potential differential between wings primarily based on the width of the vehicle and the turning cycle thereof (due to differing radians to the point of turn as later set forth). For example most bulldozers operate to apply full ground engaging power in the forward direction, whether with blade or ripper bar(s). This application, being subject to many single direction subtle steering corrections under load could utilize wings equally angled with minor angling at the ends of the bar and a small percentage of wing length. However a tracked loader may need most of its movement power in a rotating direction at a fraction of available total unit power: the breakout/lifting power of its bucket is its primary engine load. This loader application, being subject to forward and reverse major direction changes at a lower load at greater speeds than the bulldozer, could have the wings with major angling and a major percentage of length for both wings. Differential angling is more appropriate for this latter due to the higher frequency of major turning maneuvers. Note that in both instances bending of the wings for reverse ground engaging power should not be necessary. The reason for this is that the reverse power in both is a fraction of the peak forward power.

The next step is to differentiate between the various sides of the tracked vehicle. This would include consideration of the track spacing and that a particular vehicle may turn in either direction in a symmetrical fashion or that the machine may turn left more often than right unsymmetrically. In the optimum embodiment, not only application specifics, but also operator preferences would be incorporated into this calculation. Certain operators prefer to cycle left while other operators prefer to cycle right.

The next step is to select the angles in shape of the wings suitable for the particular operation of the tracked vehicle. This is mostly a manufacturing decision on what the angles and shape actually will be. Again the selection of the angles has been previously discussed and it may be appropriate in certain applications to include a differential bend across the entire length of the wing instead of at its intersection with the center section. This would allow the inclusion of many surfaces 49, each suitable for a particular operating condition of the machine.

The last step is to utilize the angles and shape into the actual bar of the shoe 10. This can be in the initial manufacture of the shoe and/or in the retrofit of a particular machine. This latter would include recognition of the fact that the operating conditions of the particular machine may vary over the service life of the machine and that thus differing geometry would be appropriate for the shoes of the particular tracked vehicle dependent upon the operation thereof.

The inner wing may be differentially angled in respect to the outer wing. This would be of particular application wherein the tracked vehicle had a high frequency of significant turning maneuvering. (This is subject to the limitation as previously set forth that the greater the width of the shoe and the greater the number of shoes on the ground the less effective differential angling would be.)

The differential angling does not have to be uniform for every shoe. However, as a practical measure it is preferred that common angling be utilized for every shoe on a given track. This eases initial manufacture and repair. It is further preferred that the differential angling be determined by the geometry of a shoe in the middle of the track section before the midpoint of a given track in respect to the expected median turning point and radius thereabout.

Figure 4:
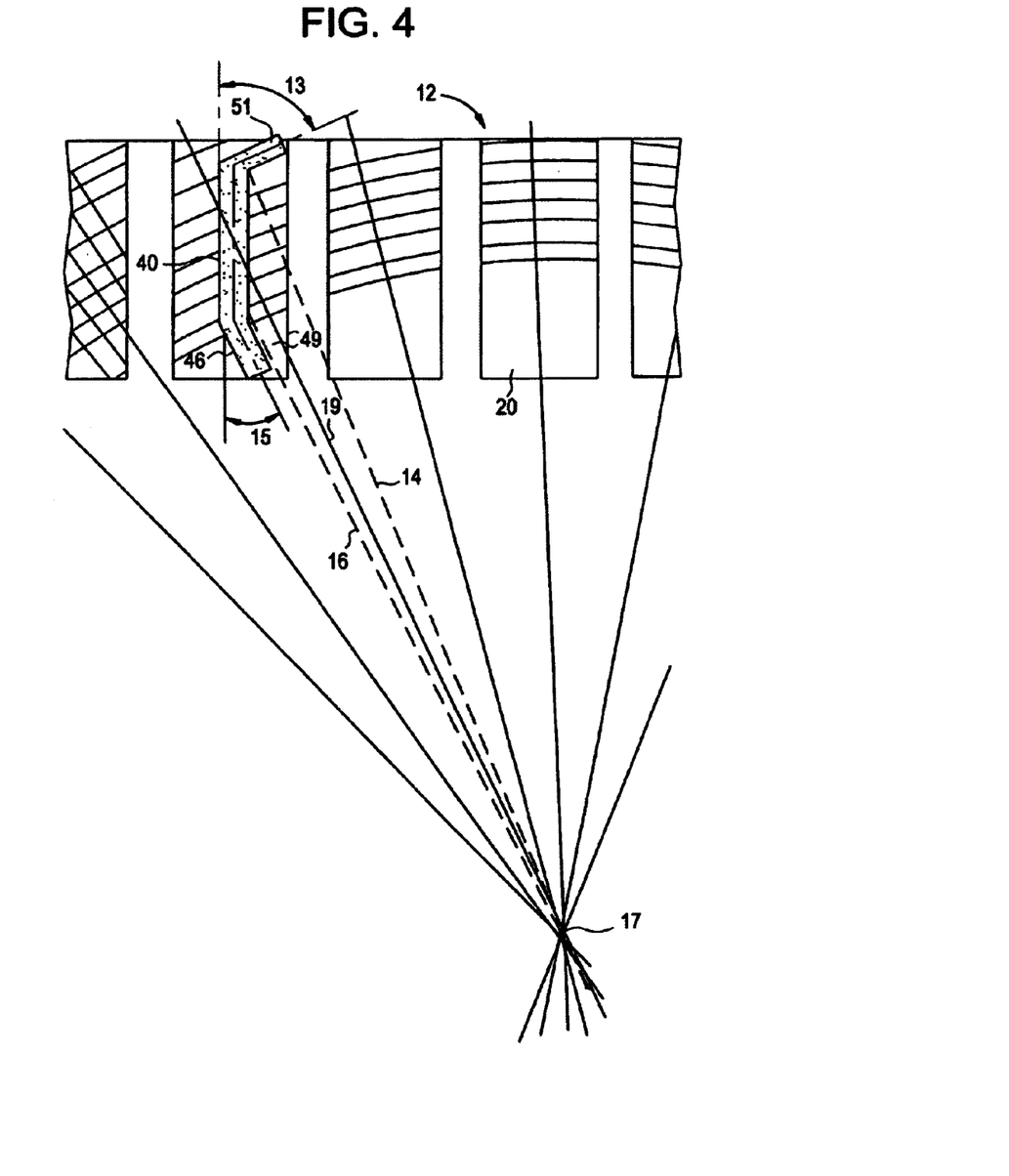
FIG. 4 is a representational drawing of possible differential angular formation of the individual wings of a given grouser shoe.

For an example, the track 12 of the vehicle may have a very high duty cycle turning around the point 17 (see FIG. 4). Under this particular condition the outer wing will be moving forward in respect to the center of the bar. For this reason it is preferred that the angle 13 of the outer wing be different than the angle 15 of the inner wing. In respect to the angle of the outer wing, because the bar 40 at this particular point is moving forward relative to the remainder of the bar, any extension of the wing beyond a line perpendicular to a radian 14 through such wing will cause drag. It is therefore preferred that this angle 13 be 90°+/−20° in respect to this radian. This will cause the shoe 10 to effectively eliminate any drag conditions in respect to the wing at this end of the bar.

In respect to the angle of the inner wing 15, this angle is important to providing the forward motive ground engaging force in respect to the shoe as described in respect to the turn surface 49. For this reason, the angle 15 between the radian 16 extending between the inner wing and the point 17 is preferably equal to an angle parallel to such radian (again +/−20°). The reason for this is that the angle of deviation will vary the phantom turn surface 49 as previously described in respect to this particular turn around point 17. In the example, this surface 49 is preferably increased until it is parallel in respect to the radian 19 to the median of the center section 41 through the midpoint of the bar 40 (i.e., it is not just the angle of the inner wing).

While the angles 13 and 15 are being set forth in this example exemplify that the geometry of a particular tracked vehicle in respect to a particular turn around point 17, it is to be realized that very few machines operate in steady state turning conditions: every machine has a certain duty cycle including a set percentage of various directional operation. For example, a tracked loader in a mine will typically have a high frequency of turns between a wall surface and the loading of a hopper/box of some nature directly behind the tracked vehicle. This operation will necessitate a minimum of straight, forward and back operations while necessitating a high frequency of swiveling around the central point of the tracked vehicle in order to accomplish the typical 180° turn duty cycle for the load/transport/dump/return operations necessary in the closed confined areas of a mine. However, a tracked blade bulldozer operating in an open area to grade a parking lot for a superman will have very few significant degree turns with instead a high frequency of minor steering corrections in a single direction. In the former, the angle 13 of the outer wing will be more highly differentiated than the angle 15 of the inner wing. Point 17 in the most cases will be close to (or even within the width of) the tracked vehicle. However, in the case of the latter, point 17 will be an extended distance from the tracked vehicle. Indeed, sufficiently far that the two angles 13, 15 could, from a manufacturing standpoint, be made equal without significant compromise to the efficiently of operation of the particular shoe. This is especially true considering the blade adjustments available to the operator.

The materials of the shoe and its dimensions, for example the length and width of the flat piece, are preferably selected dependent on the particular application. The specific grouser shoe 10 disclosed is designed to be used with Caterpillar models D7 through D11N and Komatsu D85 through D555. It is substantially rectangular in shape, having angled leading and trailing edges 26, 27 as described previously. The width of the grouser shoe 10 is determined by the manufacturer of the tracked vehicle, and is typically uniform. The length of the flat piece 21 is typically about 70% of the width of the shoe 10. The length of the leading edge 26 is typically about 15% of the width, while the length of the trailing edge 27 is typically about 10% of the width of the shoe 10. The overall length of the grouser shoe 10 is typically between 8–14" with a width of 12–20". The thickness of the pad in the preferred embodiment typically may vary between 0.75–1.25".

The pad 20 is preferably manufactured of 10B35 manganese alloy of hardness 35–40 Rc while the bar 40 is preferably 10B35 manganese alloy differentially hardened, having a hardness of 50–52 Rc for 75% at its extremity and 30–40 Rc at its joint with pad 20 (this later to facilitate welding to the pad 20). The particular bolt protector is 1" high and 1.5" wide extending from the bar to the wear bar. The particular wear bar is 1" high and 1" wide extending for the width of the pad. The bar 40 has a length approximately equal to the width of the shoe with a uniform thickness between 1–1.5". The height of the wing is preferably in the range 3.75–4.75". The width of the center 41 of the bar 40 is some 40–60% of the width of the shoe with a height equal to that of the wings. The optional raised center section would extend some 0.75–1" upwards. The wings are both angled from 10° to 30° in an example equal angled unit. (One may be angled 0–40° while the other is angled 20–60° in the differential angled unit.) The combined length of the wings added to the center total the width of the shoe subject to an offset between the edge of the pad 20 and the bar 40 of about 0–0.5".

The particular shoe 10 disclosed is, in addition to its unique geometry, subject to a unique manufacturing operation.

It has been determined by theoretical analysis and by operational experience that it is desirable to have a pad with a low hardness factor for maximization of toughness and for minimization of breakage. In standard practice, where one-piece construction is the rule, the ability to obtain this characteristic of toughness has been thought of as mutually incompatible with the incorporation of a high hardness factor in the bar.

One aspect of one embodiment of the invention described herein allows for incorporation of the most desirable features in both the pad and the bar by virtue of multiple component construction. The preferred embodiment comprises a grouser shoe wherein the pad portion is of a hardness sufficient to provide a tough, resilient structure, while the bar extending therefrom is differentially hardened. The connecting portion of the bar is of substantially the same hardness as the pad to allow for welding of the two components, while the balance of the bar becomes progressively harder as the extremity of the bar is approached, the extremity being of a hardness sufficient to substantially resist wear erosion.

This two piece construction is provided by the following manufacturing technique.

Figure 12:
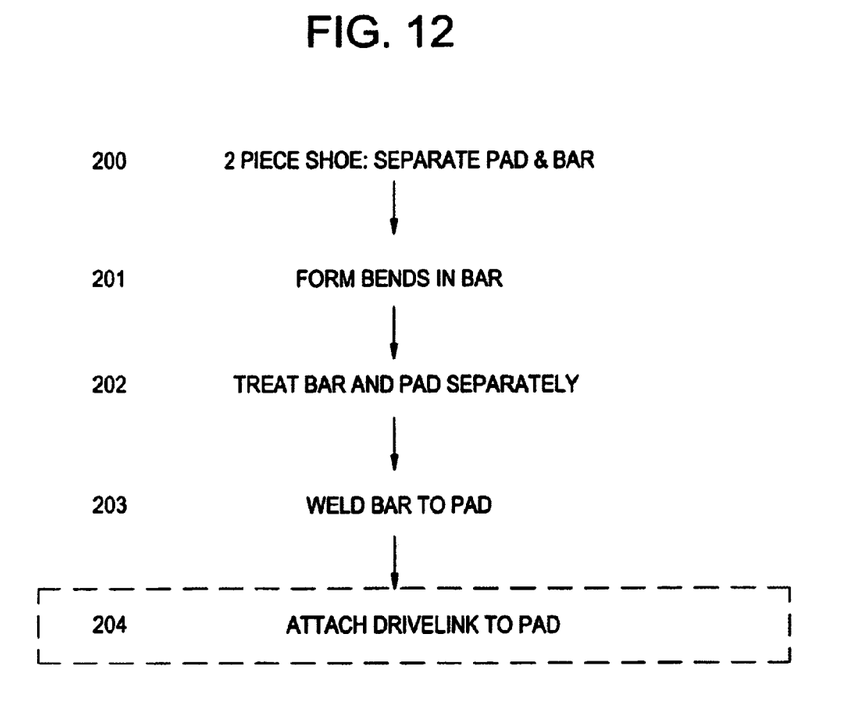
FIG. 12 is a flow chart utilized in the manufacture of the grouser shoe of FIG. 1.
Figure 13:
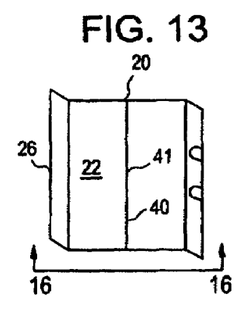
FIGS. 13–15 are top views of the grouser shoes of FIG. 1 during alternate manufacture.

The manufacturing of a two piece shoe includes initial formation of the pad 22, preferably by rolling or press forming of a piece of steel, and a separate bar 40 (being straight a cut off from a length of steel is sufficient) (FIGS. 6,7,9 10 and 200 in FIG. 12). The next step of the procedure is to bend the ends of the bar 40 to create the previously described wings 46, 51 (201 in FIG. 12). The length of the wings at any given end can be different from the other end, as can the angle between the wing 46, 51 and the center 41. Note that this technique allows for various configurations of the bar as previously described herein. While accomplished in a wide variety of ways, simple mechanical or hydraulic pressure and a single bend are preferred for manufacturing simplicity.

The various parts of the shoes are treated in order to alter the hardness/structure of the steel (202 in FIG. 12). In that the treating preferably involves raising the hardness of the bar 40 differentially in respect to the pad 20 it is preferred that such treatment occur prior to the attachment of the bar to the pad. The treatment typically increases the hardness of the outer edge of the bar so as to increase the longevity thereof, preferably to match the longevity of the pad 20. In the embodiment disclosed, it is preferred that the pad has a Rockwell hardness on the range of 30–40 Rc while the bar 40 has a hardness beginning approximately equal to that of the pad 20 near its joint therewith and increasing substantially uniformly to perhaps 50–55 Rc at the outer edge including the raised section 44 at the center thereof. This, under certain operating conditions, lengthens the service life of the bar 40 to substantially equal to that of the pad 20.

Figure 7:
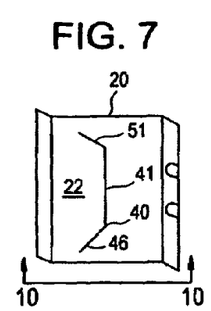
Figure 8:
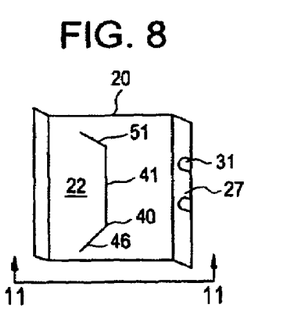
Figure 9:
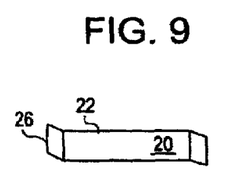
FIGS. 9–11 are respective end views of the three FIGS. 6–8 respectively.
Figure 10:
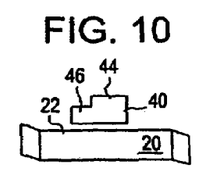
Figure 11:
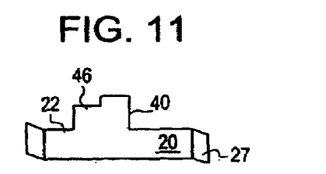

After the components have been treated, the bar 40 is positioned properly on the pad 20 (FIG. 7, 10). The bar is then welded or otherwise affixed to the pad 20 in order to make the bar integral thereto (FIGS. 8, 11 and 203 in FIG. 12). Welding is preferred for this connection due to the continuation of similar materials across the junction between the pad and the wings at this location. This strengthens this joint and reduces weld fracturing. The wear bar and bolt protectors would also be welded to the pad 20 at this time.

At this time the drive link is connected to the pad 20 (204 in FIG. 12). This completes the manufacturing of the shoe 10. Note, however, that since the hardness of the drive link equals that of the pad this connection can occur at any time.

An alternate method of manufacturing includes initial formation of a shoe having an integral pad and bar (FIGS. 13–19). This is preferably formed by rolling a single piece of steel (FIGS. 13, 16 and 100 in FIG. 19). This integral piece of steel could be formed of a steel having a single structure and hardness. It can also be a member made of differential materials which have been drawn or otherwise fused together. The former provides simplicity while the latter allows the pad and bar to have differential qualities on initial formation.

Figure 16:
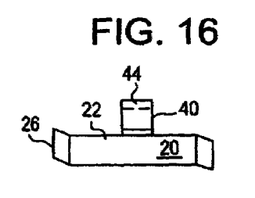
FIGS. 16–18 are respective end views of the three FIGS. 13–15 respectively.
Figure 19:
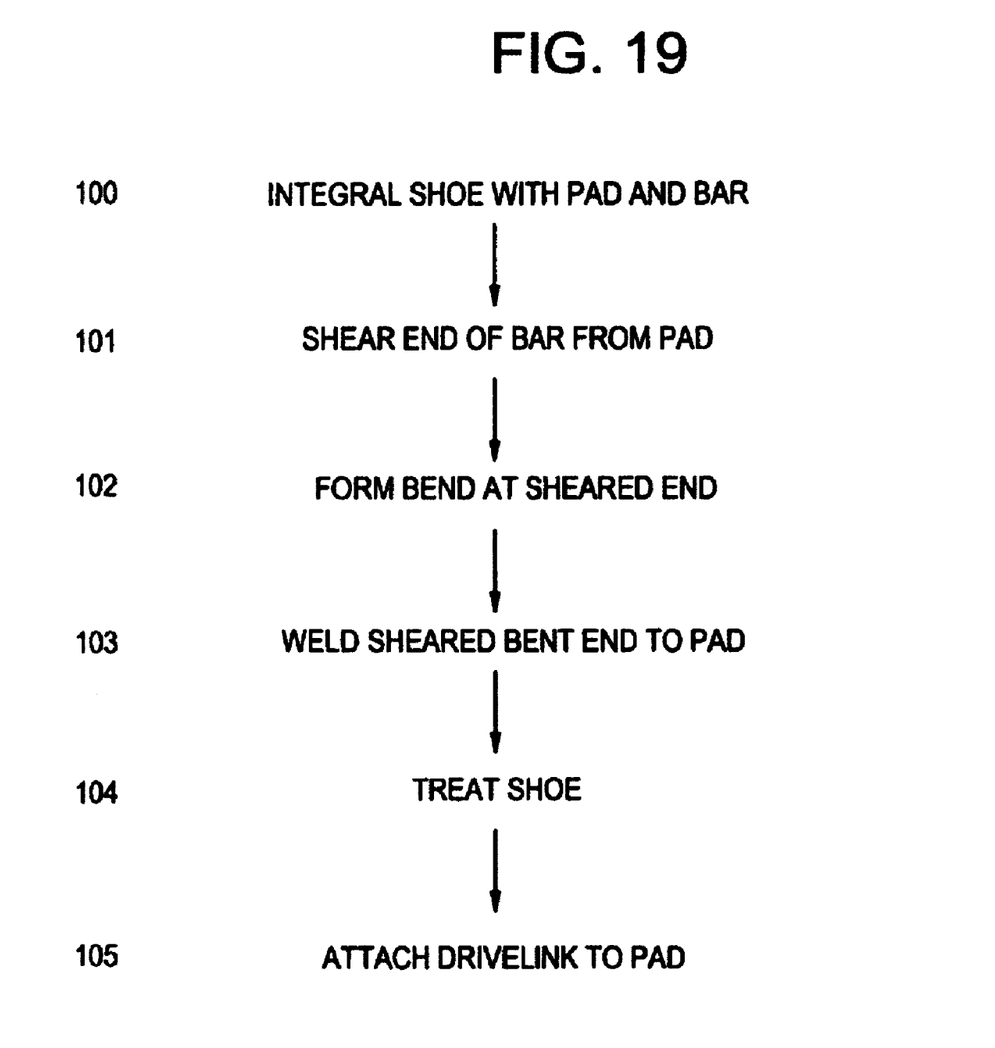
FIG. 19 is a flow chart utilized in the alternate manufacture of the grouser shoe of FIG. 1; and, FIG. 20 is an alternate embodiment of the invention.

The next step of the procedure is to shear the end(s) of the bar from the pad (101 in FIG. 19). This frees the ends of the bar for the bending process to create the previously described wings 46, 51 by making these ends no longer integral with the pad for the distance approximately equal to the length of the wings (FIG. 16). The length of the shear at any particular end can be different from the other end (note that in this preferred embodiment the center 41 of the shoe remains integral with the pad 20. This strengthens this critical joint and eliminates fatigue separation and other problems inherent in a manufactured right angle joint).

Figure 14:
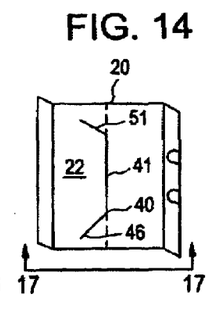
Figure 17:
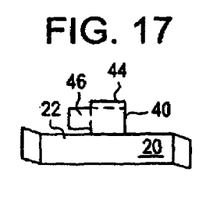

The following step is to form bends at the sheared ends, such ends having been separated from the bar by the previous step, in order to create the particular wing (FIGS. 14, 17 and 102 in FIG. 19). Note that the degree of angle may also differ between the two wings 46, 51 described.

Figure 15:
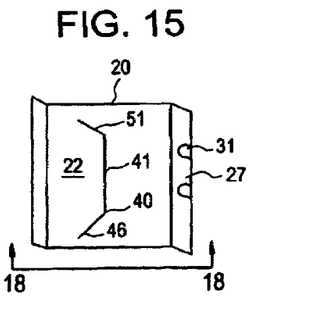
Figure 18:
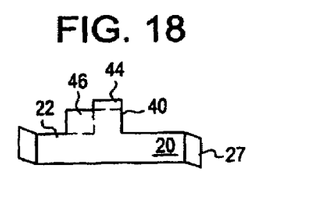

After the bends are formed, the wings are then welded or otherwise affixed back to the pad 20 in order to make the wings integral thereto (FIGS. 15, 18 and 103 in FIG. 19). Welding is preferred for this connection due to the continuation of similar materials across the junction between the pad and wings at this location.

The various parts of the shoe (including bar) are then treated in order to alter the hardness/structure of the steel (104 in FIG. 19). This treating preferably involves raising the hardness of the bar 40 differentially in respect to the pad 20, particularly its outer edge. It is preferred that this treatment occur after the reunification of the ends of the bar back to the pad so as not to compromise this connection.

The drivelink 60 is attached to the bottom surface 24 of the pad 20 in order to complete the shoe (105 in FIG. 19). In that the hardness of the pad 20 remains relatively constant (in contrast to the bar 40) this connection can occur at any time. It is again preferred, however, that this connection occur after the treatment of the pad/bar in order not to unduly compromise this manufacturing operation.

Although the invention has been described in its preferred form in a certain degree of particularity, it is to be understood that numerous changes can be made without deviating from the invention as herein after claimed.

What is claimed:

1. A grouser shoe for a tracked vehicle, the grouser shoe having a pad and a bar with a center and an end, the bar has a second end, the shoe comprising the bar being of uniform thickness and being integral with the pad, the center of the bar having a center straight section with a center axis, the end of the bar having an end axis, said end axis being angled in respect to said center axis to form a wing at the end of the bar, the bar having a second end, the second end has having a second end axis, said second end axis being angled in respect to said center axis to form a second wing, and said second end axis being differentially angled in respect to said center bar than said end axis.

2. The grouser shoe of claim 1 characterized in that the center of the bar has a center height, the end of the bar has an end height, and said center height being greater than said end height.

3. A grouser shoe for a tracked vehicle, the grouser shoe having a pad and a bar with a center and an end, the end has a length,
   the shoe comprising the bar being of uniform thickness and being integral with the pad,
   the center of the bar having a center straight section with a center axis,
   the end of the bar having an end axis, said end axis being angled in respect to said center axis to form a wing at the end of the bar,
   the second end has a second end axis, said second end axis being angled in respect to said center axis to form a second wing at the second end of the bar,
   the second end having a second length, and said second length being different than said length.

4. A grouser shoe for a tracked vehicle, the grouser shoe having a pad and a bar with a center and an end,
   the shoe comprising the bar being of uniform thickness and being integral with the pad, the bar extending upwardly off of the pad to form the primary ground engaging drive connection for the shoe,
   the center of the bar having a center axis,
   the end of the bar having an end axis, said end axis being angled in respect to said center axis to form a wing at the end of the bar,
   the bar having a second end, the second end having a second end axis, said second end axis being angled in respect to said center axis to form a second wing,
   said second end axis being differentially angled in respect to said center bar than said end axis,
   the bar being formed separately from the pad, and the bar and pad being joined to form the shoe.

5. A grouser shoe for a tracked vehicle, the grouser shoe having a pad and a bar with a center and an end,
   the shoe comprising the bar being of uniform thickness and being integral with the pad, the bar extending upwardly off of the pad to form the primary ground engaging drive connection for the shoe,
   the center of the bar having a center axis,
   the end of the bar having an end axis, said end axis being angled in respect to said center axis to form a wing at the end of the bar,
   the bar having a second end, the second end having a second end axis, said second end axis being angled in respect to said center axis to form a second wing,
   said second end axis being differentially angled in respect to said center bar than said end axis,
   the bar being formed separately from the pad and welded onto the pad.

6. The grouser shoe of claim 5 characterized in that the bar is differentially hardened, and the hardness of the bar approximating that of the pad along the joint thereto.

7. A grouser shoe for a tracked vehicle, the grouser shoe having a pad and a bar with a center and an end,
   the shoe comprising the bar being of uniform thickness and being integral with the pad, the bar extending upwardly off of the pad to form the primary ground engaging drive connection for the shoe,
   the center of the bar having a center axis,
   the end of the bar having an end axis, said end axis being angled in respect to said center axis to form a wing at the end of the bar,
   the bar having a second end, the second end having a second end axis, said second end axis being angled in respect to said center axis to form a second wing,
   said second end axis being differentially angled in respect to said center bar than said end axis,
   the bar being formed separately from the pad with part of the bar being differentially hardened in respect to the pad.

8. The grouser shoe of claim 7 characterized in that the bar joints the pad at a joint and the pad has a Rockwell hardness,
   said Rockwell hardness being in the range of 30–40 Rc and the bar has a hardness substantially similar to that of the pad at its joint therewith with its hardness increasing substantially uniformly outwardly therefrom to substantially 50–55 Rc.

9. A grouser shoe for a tracked vehicle, the grouser shoe having a pad and a bar with a center and an end,
   the shoe comprising the bar being of uniform thickness and being integral with the pad, the bar extending upwardly off of the pad to form the primary ground engaging drive connection for the shoe,
   the center of the bar having a center axis,
   the end of the bar having an end axis, said end axis being angled in respect to said center axis to form a wing at the end of the bar,
   the bar having a second end, the second end having a second end axis, said second end axis being angled in respect to said center axis to form a second wing,
   said second end axis being differentially angled in respect to said center bar than said end axis,
   the bar and pad being formed as a single piece, with the end of the bar being sheared from the pad, bent, and then reattached to the pad to form said wing.

10. The grouser shoe of claim 9 characterized in that the bar has ends, with said ends being sheared from the pad, bent, and then reattached to the pad to form the wings.

11. A grouser shoe for a tracked vehicle, the grouser shoe having a pad and a bar with a center and an end,
    the shoe comprising the bar being of uniform thickness and being integral with the pad, the bar extending upwardly off of the pad to form the primary ground engaging drive connection for the shoe,
    the center of the bar having a center axis,
    the end of the bar having an end axis, said end axis being angled in respect to said center axis to form a wing at the end of the bar,
    the bar having a second end, the second end having a second end axis, said second end axis being angled in respect to said center axis to form a second wing,
    said second end axis being differentially angled in respect to said center bar than said end axis,
    the ends of the bar and pad being attached by welding.

12. A grouser shoe for a tracked vehicle, the grouser shoe having a pad and a bar with a center and two ends,
    the shoe comprising the bar being of uniform thickness and being integral with the pad, the bar extending upwardly off of the pad to form the primary ground engaging drive connection for the shoe,
    the center of the bar having a center straight section with a center axis, both ends of the bar having end axes respectively,
    and said end axes being differentially angled in respect to said center axis to form differentially angled wings at the ends of the bar.

13. A grouser shoe for a tracked vehicle, the grouser shoe having a pad and a bar with a center and two ends,
   the shoe comprising the bar being of uniform thickness and being integral with the pad,
   the center of the bar having a center straight section with a center axis, both ends of the bar having end axes respectively,
   said end axes being angled in respect to said center axis to form wings at the end of the bar,
   and said first and second end axes being differentially angled in respect to said center axis.

14. A grouser shoe of claim 13 characterized in that the bar has a center and two ends, said center and two ends each having a height, and said center height being greater than said end heights.

15. A grouser shoe for a tracked vehicle, the grouser shoe having a pad and a bar with a center and two ends,
   the shoe comprising the bar being of uniform thickness and being integral with the pad, the bar extending upwardly off of the pad to form the primary ground engaging drive connection for the shoe,
   the center of the bar having a center straight section with a center axis, both ends of the bar having end axes respectively,
   said end axes being angled in respect to said center axis to form wings at the end of the bar,
   the two ends have specified lengths, and said specified lengths being different respectively.

16. A grouser shoe for a tracked vehicle, the grouser shoe having a pad and a bar with a center and two ends,
   the shoe comprising the bar being of uniform thickness and being integral with the pad, the bar extending upwardly off of the pad to form the primary ground engaging drive connection for the shoe,
   the center of the bar having a center axis, both ends of the bar having end axes respectively,
   said end axes being angled in respect to said center axis to form wings at the end of the bar, said first and second end axes being differentially angled in respect to said center axis,
   the bar being formed separately from the pad, and the bar and the pad being joined to form the shoe.

17. The grouser shoe of claim 16 characterized in that the bar is welded onto the pad.

18. A grouser shoe for a tracked vehicle, the grouser shoe having a pad and a bar with a center and two ends,
   the shoe comprising the bar being of uniform thickness and being integral with the pad, the bar extending upwardly off of the pad to form the primary ground engaging drive connection for the shoe,
   the center of the bar having a center axis, both ends of the bar having end axes respectively,
   said end axes being angled in respect to said center axis to form wings at the end of the bar, said first and second end axes being differentially angled in respect to said center axis,
   the bar being differentially hardened in respect to the pad.

19. The grouser shoe of claim 18 characterized in that the bar is integral with the pad at a joint and has a hardness, said hardness approximating that of the pad along the joint therewith.

20. A grouser shoe for a tracked vehicle, the grouser shoe having a pad and a bar with a center and two ends,
   the shoe comprising the bar being of uniform thickness and being integral with the pad, the bar extending upwardly off of the pad to form the primary ground engaging drive connection for the shoe,
   the center of the bar having a center axis, both ends of the bar having end axes respectively,
   said end axes being angled in respect to said center axis to form wings at the end of the bar, said first and second end axes being differentially angled in respect to said center axis,
   the bar and pad being formed as a single piece, with the ends of the bar being sheared from the pad, bent, and reattached integrally to the pad to form said wings.

21. A grouser shoe for a tracked vehicle, the grouser shoe having a pad and a bar with a center and two ends,
   the shoe comprising the bar being of uniform thickness and being integral with the pad, the bar extending upwardly off of the pad to form the primary ground engaging drive connection for the shoe,
   the center of the bar having a center axis, both ends of the bar having end axes respectively,
   said end axes being angled in respect to said center axis to form wings at the end of the bar, said first and second end axes being differentially angled in respect to said center axis,
   the ends of the bar being welded to the pad to reattach said wings.

22. A method for manufacturing a grouser shoe for a tracked vehicle, said method comprising forming a pad and forming a bar having a uniform thickness with a center and two ends, bending the ends of the bar to form wings, attaching the bar to the pad, shearing the ends of the bar to form the wings, welding the sheared ends of the bar back to the pad, and
   the bar extending upwardly off of the pad to form the primary ground engaging drive connection for the shoe.

23. A method for manufacturing a grouser shoe for a tracked vehicle, said method comprising forming a pad and forming a bar having a uniform thickness with a center and two ends, bending the ends of the bar to form wings, attaching the wings to the pad, and the ends of the bar being bent to form wings of different lengths.

24. A method for manufacturing a grouser shoe for a tracked vehicle, said method comprising forming a pad and forming a bar having a uniform thickness with a center and two ends,
   the bar extending upwardly off of the pad to form the primary ground engaging drive connection for the shoe,
   bending the ends of the bar to form wings, the ends of the bar being bent to form wings of different lengths,
   attaching the wings to the pad, and the end of the bar being bent to form an angle between 10–20° between such end and the center of the bar.

25. A method for manufacturing a grouser shoe for a tracked vehicle, said method comprising forming a pad and forming a bar having a uniform thickness with a center and two ends, bending the ends of the bar to form wings, attaching the wings to the pad, and the ends of the bar being bent to form wings having different angles between the ends and the center of the bar respectively.

26. A method for manufacturing a grouser shoe for a tracked vehicle, said method comprising forming a pad and forming a bar having a uniform thickness with a center and two ends,
   the bar extending upwardly off of the pad to form the primary ground engaging drive connection for the shoe,
   bending the ends of the bar to form wings, the ends of the bar being bent to form wings of different lengths,
   attaching the wings to the pad, and the grouser shoe being treated to alter the physical properties of the bar.

27. A method of claim 26 characterized in that the grouser shoe is differentially heat treated such that the bar has a hardness substantially similar to that of the pad at the joint therewith, and said hardness of the bar increases outwardly therefrom.

28. A method of claim 27 characterized in that the pad has a Rockwell hardness, said Rockwell hardness being in the range of 35–40 Rc and the bar has a Rockwell hardness, said Rockwell hardness being substantially 50–55 Rc at its outer edge.

29. A method for manufacturing a grouser shoe for a tracked vehicle, said method comprising forming a pad having a flat piece,
separately forming a bar of uniform thickness, the bar having a center and two ends,
the center having a center axis and each end having an end axis respectively,
forming wings by bending the ends of the bar to produce an angle between the center axis and each respective end axis to create a bar having a "C" shaped cross section,
attaching the bar to the pad, and
the wings are of different lengths.

30. A method of claim 29 characterized in that the angle between the center axis and the respective end axis is between 10–20°.

31. A method for manufacturing a grouser shoe for a tracked vehicle, said method comprising forming a pad having a flat piece,
separately forming a bar of uniform thickness, the bar having a center and two ends, the bar extending upwardly off of the pad to form the primary ground engaging drive connection for the shoe,
the center having a center axis and each end having an end axis respectively,
forming wings by bending the ends of the bar to produce an angle between the center axis and each respective end axis to create a bar having a "C" shaped cross section,
the wings have different angles between the center axis and each respective end axis,
and attaching the bar to the pad.

32. A method of claim 29 characterized in that the grouser shoe is differentially treated such that the bar has a hardness substantially similar to that of the pad at the joint therewith, and said hardness of the bar increasing outwardly therefrom.

33. A method of claim 32 characterized in that the pad has a Rockwell hardness of about 35–40 Rc and the bar has a hardness of substantially 50–55 Rc at its outer edge.

34. A method for manufacturing a grouser shoe for a tracked vehicle, said method comprising forming a pad having a flat piece and an integral bar,
the bar being of uniform thickness and having a center and two ends, the center having a center axis and each end having an end axis, respectively,
shearing the ends of the bar from the pad,
forming wings by bending the ends of the bar to produce an angle between the center axis and each respective end axis,
and reattaching the wings to the pad.

35. A method of claim 34 characterized in that the wings are of different lengths.

36. A method of claim 34 characterized in that the angle between the center axis and the respective end axis is between 10–20°.

37. A method of claim 34 characterized in that the wings have different angles between the center axis and each respective end axis.

38. A method of claim 34 characterized in that the grouser shoe is differentially treated such that the bar has a hardness substantially similar to that of the pad at the joint therewith, and said hardness of the bar increasing outwardly therefrom.

39. A method of claim 38 characterized in that the pad has a Rockwell hardness of about 30–40 Rc and the bar has a hardness of some 52–55 Rc at its outer edge.

40. A method for manufacturing a grouser shoe for a tracked vehicle, said method comprising forming a pad having a flat piece with a leading edge, a trailing edge, and an integral bar,
the length of the flat piece being substantially 60–80% of the width of the pad,
the width of the leading edge being substantially 10–20% of the length of the pad,
the width of the trailing edge being substantially 5–15% of the length of the pad,
the bar being of uniform thickness and having a center and two ends, the center having a center axis and each end having an end axis respectively,
shearing the ends of the bar from the pad,
forming wings by differentially bending the ends of the bar to produce a differential angle of substantially 10–20° between the center axis and each respective end axis creating a bar having a "C" shaped cross section,
reattaching the wings to the pad,
the bar extending upwardly off of the pad to form the primary ground engaging drive connection for the shoe,
and differentially heat treating the pad to a hardness of substantially 35–40 Rc and the bar to a hardness of substantially 50–52 Rc for 75% of its extremity and 35–40 Rc at its joint with the pad.

* * * * *